US011973380B2

(12) United States Patent
Kobayashi et al.

(10) Patent No.: US 11,973,380 B2
(45) Date of Patent: Apr. 30, 2024

(54) ELECTRIC PUMP

(71) Applicant: NIDEC TOSOK CORPORATION, Kanagawa (JP)

(72) Inventors: Yoshiyuki Kobayashi, Kanagawa (JP); Tomohiro Sakata, Kanagawa (JP); Yuzo Nagai, Kanagawa (JP); Hideo Nagai, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 293 days.

(21) Appl. No.: 17/577,331

(22) Filed: Jan. 17, 2022

(65) Prior Publication Data

US 2022/0235765 A1 Jul. 28, 2022

(30) Foreign Application Priority Data

Jan. 25, 2021 (JP) ................. 2021-009801

(51) Int. Cl.
*H02K 11/33* (2016.01)
(52) U.S. Cl.
CPC ........ *H02K 11/33* (2016.01); *F04C 2240/808* (2013.01)
(58) Field of Classification Search
CPC ......... H02K 11/33; F04B 17/03; F04B 35/04; F04C 2240/808; F04D 13/0686; F04D 25/068
See application file for complete search history.

(56) References Cited

U.S. PATENT DOCUMENTS

| 6,808,372 B2* | 10/2004 | Makino ................ F04C 28/08 417/410.5 |
| 9,837,876 B2* | 12/2017 | Ishimaru ............. H02K 11/215 |
| 10,047,745 B2 | 8/2018 | Tamura |
| 2004/0226761 A1* | 11/2004 | Takenaka .............. B60K 6/405 903/906 |
| 2008/0141693 A1* | 6/2008 | Enami ................ F04C 18/3564 62/228.4 |
| 2010/0074772 A1* | 3/2010 | Hoshino ................ F04B 35/04 417/410.1 |
| 2010/0181876 A1* | 7/2010 | Watanabe ............. H02K 11/33 310/68 D |
| 2010/0284838 A1* | 11/2010 | Ichise .................. H02K 11/33 417/410.1 |

(Continued)

*Primary Examiner* — Thomas Fink
(74) *Attorney, Agent, or Firm* — HAUPTMAN HAM, LLP (57) ABSTRACT

An aspect of an electric pump of the present invention is an electric pump attached to a predetermined object. The electric pump includes a motor having a rotor rotatable about a center axis extending in an axial direction, a pump mechanism coupled to the rotor, a circuit board located radially outside the motor and having a plate face directed in a radial direction, an electrolytic capacitor attached to the plate face of the circuit board, and a housing that houses the motor, the pump mechanism, the circuit board, and the electrolytic capacitor therein. The housing has a mounting face attached to a predetermined object. The mounting face is a face directed radially outward. The plate face of the circuit board is disposed along a direction intersecting the mounting face. The electrolytic capacitor is disposed at a position closer to the mounting face than the center axis in the direction orthogonal to the mounting face.

10 Claims, 4 Drawing Sheets

(56) References Cited

U.S. PATENT DOCUMENTS

| | | | | |
|---|---|---|---|---|
| 2015/0375714 | A1* | 12/2015 | Umeno | B60S 1/0896 |
| | | | | 310/68 D |
| 2017/0207567 | A1* | 7/2017 | Rech | F04B 39/14 |
| 2017/0324300 | A1* | 11/2017 | Yamashita | H02K 5/24 |
| 2019/0195347 | A1* | 6/2019 | Kataoka | F16H 57/0446 |
| 2019/0195348 | A1* | 6/2019 | Kataoka | F01M 1/02 |
| 2019/0301468 | A1* | 10/2019 | Kataoka | F04C 2/102 |
| 2019/0301596 | A1* | 10/2019 | Kobayashi | F04C 13/001 |
| 2019/0323509 | A1* | 10/2019 | Gashi | F04D 17/122 |
| 2020/0308999 | A1* | 10/2020 | Kobayashi | F16N 13/20 |
| 2022/0170457 | A1* | 6/2022 | Miyata | F04C 15/008 |

* cited by examiner

ELECTRIC PUMP

CROSS-REFERENCE TO RELATED APPLICATIONS

The present invention claims priority under 35 U.S.C. § 119 to Japanese Patent Application No. 2021-009801 filed on Jan. 25, 2021, the entire content of which is incorporated herein by reference.

FIELD OF THE INVENTION

The present invention relates to an electric pump.

BACKGROUND

An electric pump attached to a predetermined object is known. For example, an electric oil pump mounted on an automatic transmission of an automobile is conventionally known.

The electric pump as described above may include a circuit board in which an electrolytic capacitor is attached. In this case, when the predetermined object to which the electric pump is attached is an object in which vibration occurs, such as an automatic transmission of an automobile, there is a possibility that a malfunction such as damage occurs in the electrolytic capacitor in the electric pump due to vibration transmitted from the predetermined object.

SUMMARY

An aspect of an electric pump of the present invention is an electric pump attached to a predetermined object. The electric pump includes a motor having a rotor rotatable about a center axis extending in an axial direction, a pump mechanism coupled to the rotor, a circuit board located radially outside the motor and having a plate face directed in a radial direction, an electrolytic capacitor attached to the plate face of the circuit board, and a housing that houses the motor, the pump mechanism, the circuit board, and the electrolytic capacitor therein. The housing has a mounting face attached to the predetermined object. The mounting face is a face directed radially outward. The plate face of the circuit board is disposed along a direction intersecting the mounting face. The electrolytic capacitor is disposed at a position closer to the mounting face than the center axis in the direction orthogonal to the mounting face.

The above and other elements, features, steps, characteristics and advantages of the present disclosure will become more apparent from the following detailed description of the preferred embodiments with reference to the attached drawings.

DETAILED DESCRIPTION

Figure 1:
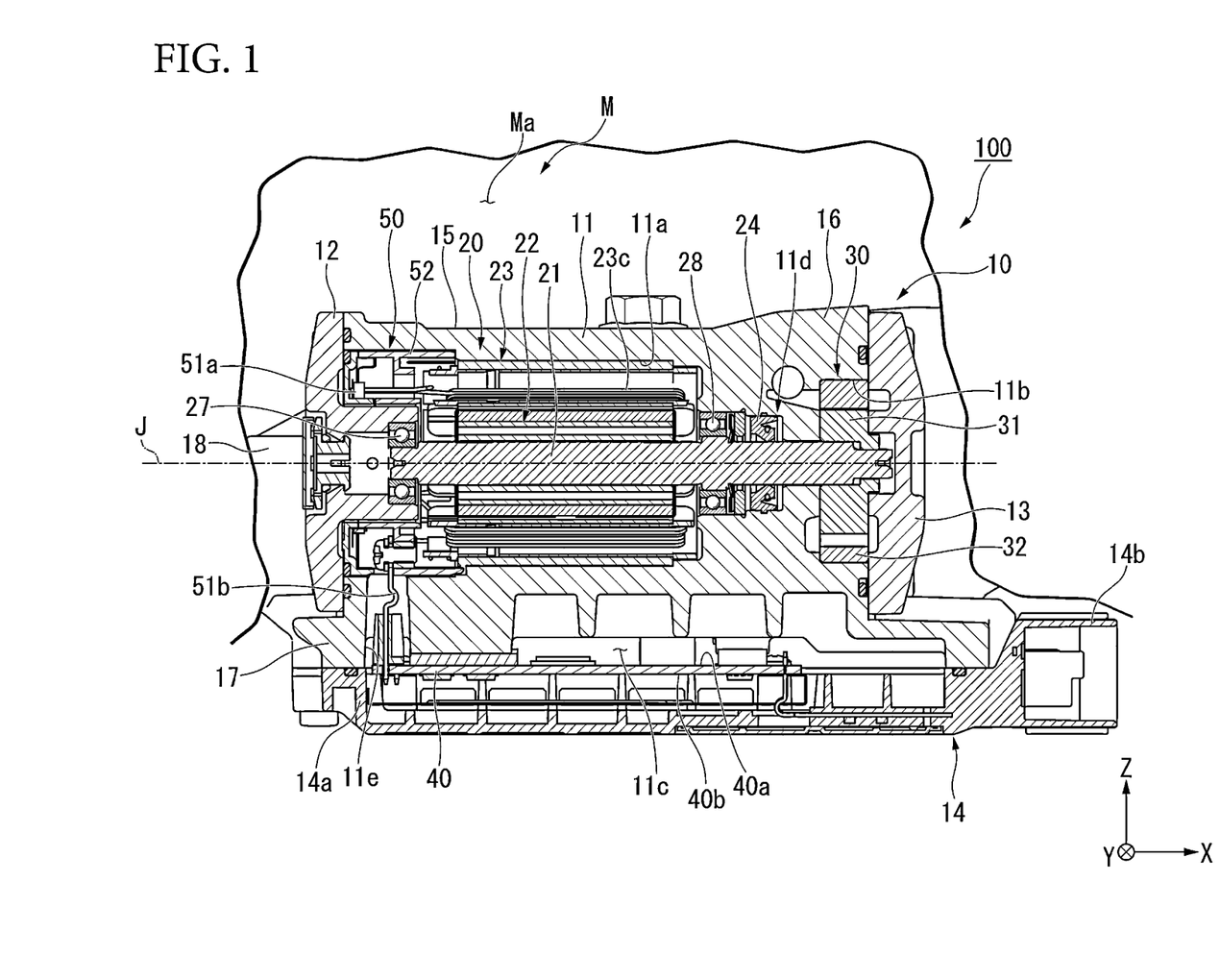
FIG. 1 is a sectional view illustrating part of the electric pump of an embodiment.
Figure 2:
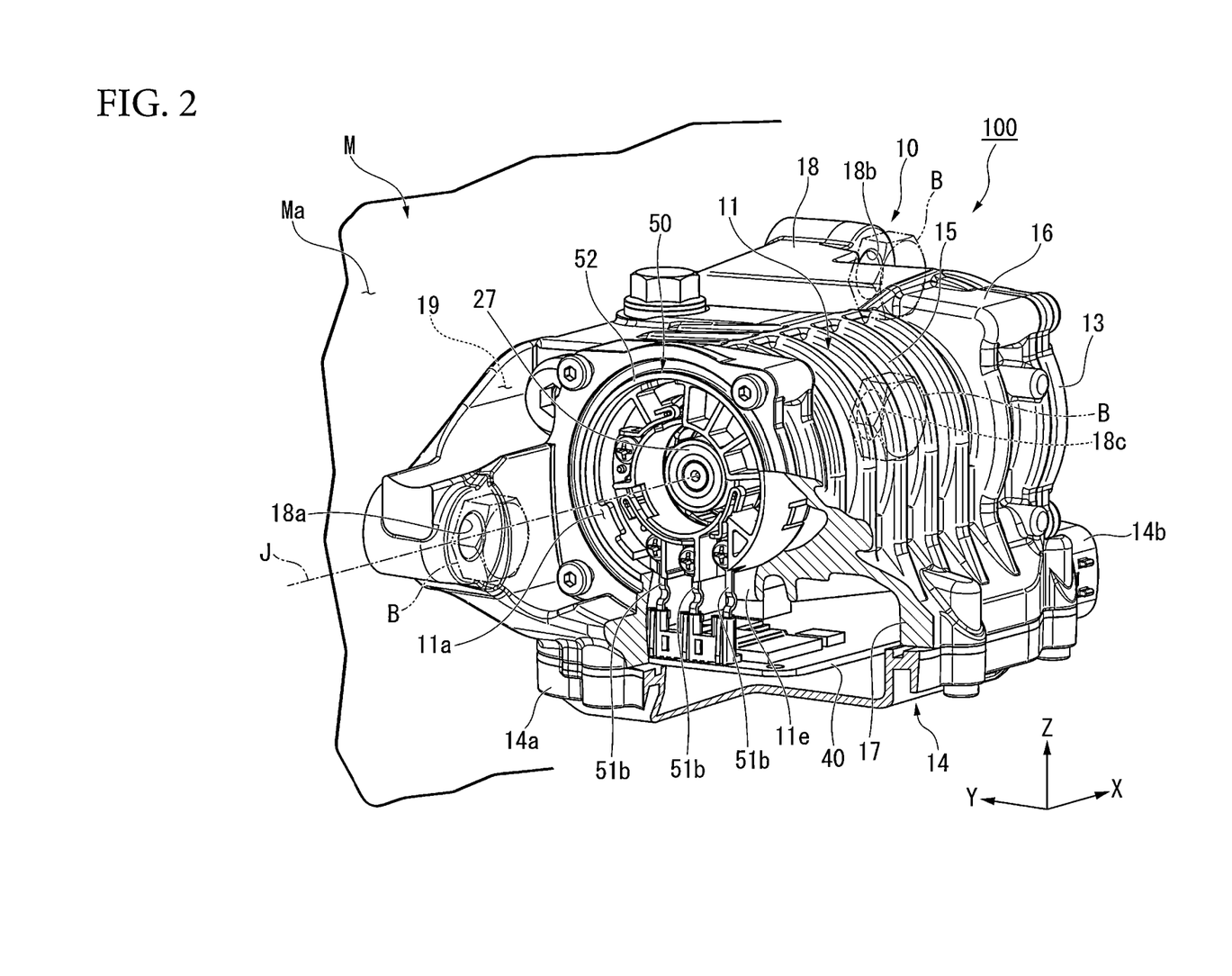
FIG. 2 is a partially sectional perspective view illustrating part of the electric pump of an embodiment.

An electric pump 100 of the present embodiment illustrated in FIGS. 1 and 2 is an electric pump attached to a device M mounted on a vehicle. That is, the device M corresponds to a predetermined object to which the electric pump 100 is attached. The device M is not particularly limited, and may be an automatic transmission or a drive device that drives an axle of a vehicle. The electric pump 100 is, for example, an electric oil pump that supplies oil to the device M.

Figure 4:
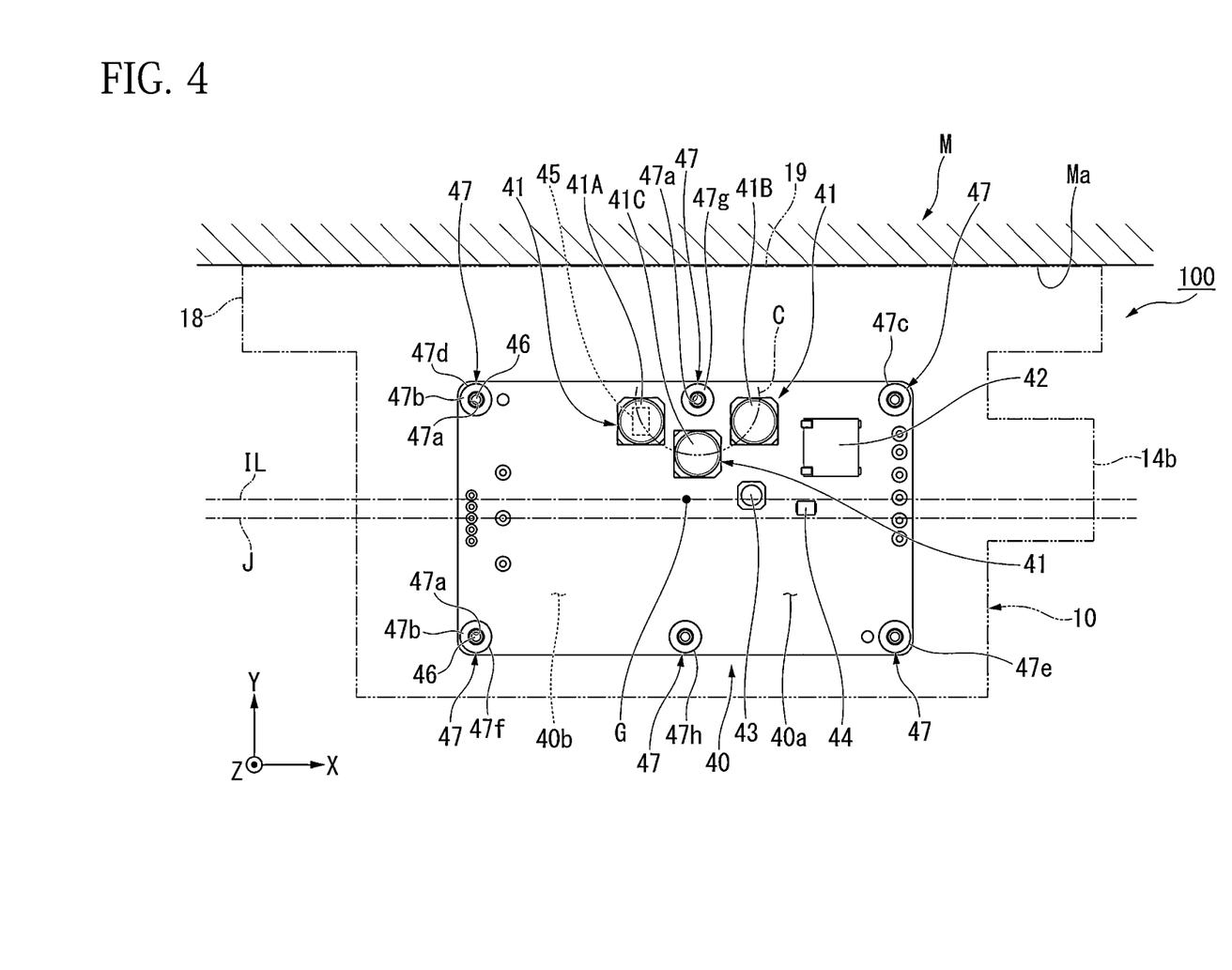
FIG. 4 is a view of the circuit board of an embodiment when viewed from upper side.

In the present embodiment, the electric pump 100 is attached to the device M in a direction orthogonal to the vertical direction. A direction in which the electric pump 100 is attached to the device M is orthogonal to a direction in which a center axis J of a motor 20 described later of the electric pump 100 extends. The center axis J illustrated in FIGS. 1, 2, and 4 is an imaginary line extending in a direction orthogonal to the vertical direction.

In each diagram, the vertical direction is a direction parallel to the Z-axis. In the vertical direction, a side (+Z side) in which the arrow of the Z-axis is directed is an upper side. In the vertical direction, a side (−Z side) opposite to a side where the arrow of the Z-axis is directed is a lower side. In each drawing, the direction in which the electric pump 100 is attached to the device M is a direction parallel to the Y-axis orthogonal to the Z-axis. In the following description, a direction parallel to the Y-axis is referred to as a "mounting direction". In the mounting direction, a side (+Y side) in which the arrow of the Y-axis is directed is referred to as "the one side in the mounting direction". In the mounting direction, a side (−Y side) opposite to the side in which the arrow of the Y-axis is directed is referred to as "the other side in the mounting direction".

In each drawing, the direction in which the center axis J extends is a direction parallel to the X-axis orthogonal to both the Z-axis and the Y-axis. In the following description, a direction in which the center axis J extends, that is, a direction parallel to the X-axis is referred to as an "axial direction". A radial direction centered on the center axis J is simply referred to as a "radial direction". A circumferential direction centered on the center axis J is simply referred to as a "circumferential direction". In the axial direction, a side (+X side) in which the arrow of the X-axis is directed is referred to as a "front side". In the axial direction, a side (−X side) opposite to a side in which the arrow of the X-axis is directed is referred to as a "rear side".

As illustrated in FIG. 1, the electric pump 100 includes a housing 10, a motor 20, a pump mechanism 30, a circuit board 40, and a bus bar assembly 50. The housing 10 accommodates the motor 20, the pump mechanism 30, the circuit board 40, and the bus bar assembly 50 therein.

The housing 10 includes a housing body 11, a motor cover 12, pump cover 13, and a board cover 14. The housing body 11, the motor cover 12, the pump cover 13, and the board cover 14 are separate members. The motor cover 12 is attached to the rear side (−X side) of the housing body 11. The pump cover 13 is attached to the front side (+X side) of the housing body 11. The board cover 14 is attached to the lower side of the housing body 11.

As illustrated in FIG. 2, the housing body 11 includes a motor housing 15, a pump housing 16, a board housing 17, and a mounting portion 18. In the present embodiment, the motor housing 15, the pump housing 16, the board housing 17, and the mounting portion 18 are portions of the same single member.

In the present embodiment, the motor housing 15 has a cylindrical shape extending in the axial direction. As illustrated in FIG. 1, the motor housing 15 has a first housing recess 11a including a recess opened to the rear side (−X side). The opening at the rear side of the first housing recess 11a is closed by the motor cover 12.

The pump housing 16 is connected to the front side (+X side) of the motor housing 15. The pump housing 16 has a second housing recess 11b including a recess opened to the front side. The opening at the front side of the second housing recess 11b is closed by the pump cover 13.

The board housing 17 is located below the motor housing 15 and the pump housing 16. The board housing 17 extends in the axial direction. An end of the board housing 17 at the front side (+X side) protrudes to the front side relative to the pump housing 16 and the pump cover 13. The board housing 17 has a third housing recess 11c including a recess opening downward. The lower opening of the third housing recess 11c is closed by the board cover 14. For example, at least some of the electronic components attached to an upper plate face 40a described later of the circuit board 40 is accommodated in the third housing recess 11c.

As illustrated in FIG. 2, the mounting portion 18 is located at the one side in the mounting direction (+Y side) of the motor housing 15 and the pump housing 16. The mounting portion 18 extends in the axial direction. The mounting portion 18 protrudes to the rear side (−X side) relative to the motor housing 15 and the motor cover 12. The mounting portion 18 protrudes to the front side (+X side) relative to the pump housing 16 and the pump cover 13.

The mounting portion 18 has through holes 18a, 18b, and 18c penetrating the mounting portion 18 in the mounting direction. The through hole 18a is provided in a portion, of the mounting portion 18, protruding to the rear side (−X side) relative to the motor housing 15 and the motor cover 12. The through hole 18b and the through hole 18c are each provided at a portion, of the mounting portion 18, protruding to the front side (+X side) relative to the pump housing 16 and the pump cover 13. The through hole 18b and the through hole 18c are disposed side by side at intervals in the vertical direction. A bolt B to be tightened into a screw hole (not illustrated) provided in the device M passes through each of the through holes 18a, 18b, and 18c from the other side in the mounting direction (−Y side). In the present embodiment, the mounting portion 18 is attached to the device M by three bolts B. With this configuration, the electric pump 100 is attached to the device M. The electric pump 100 is attached to the device M in a cantilever manner.

Figure 3:
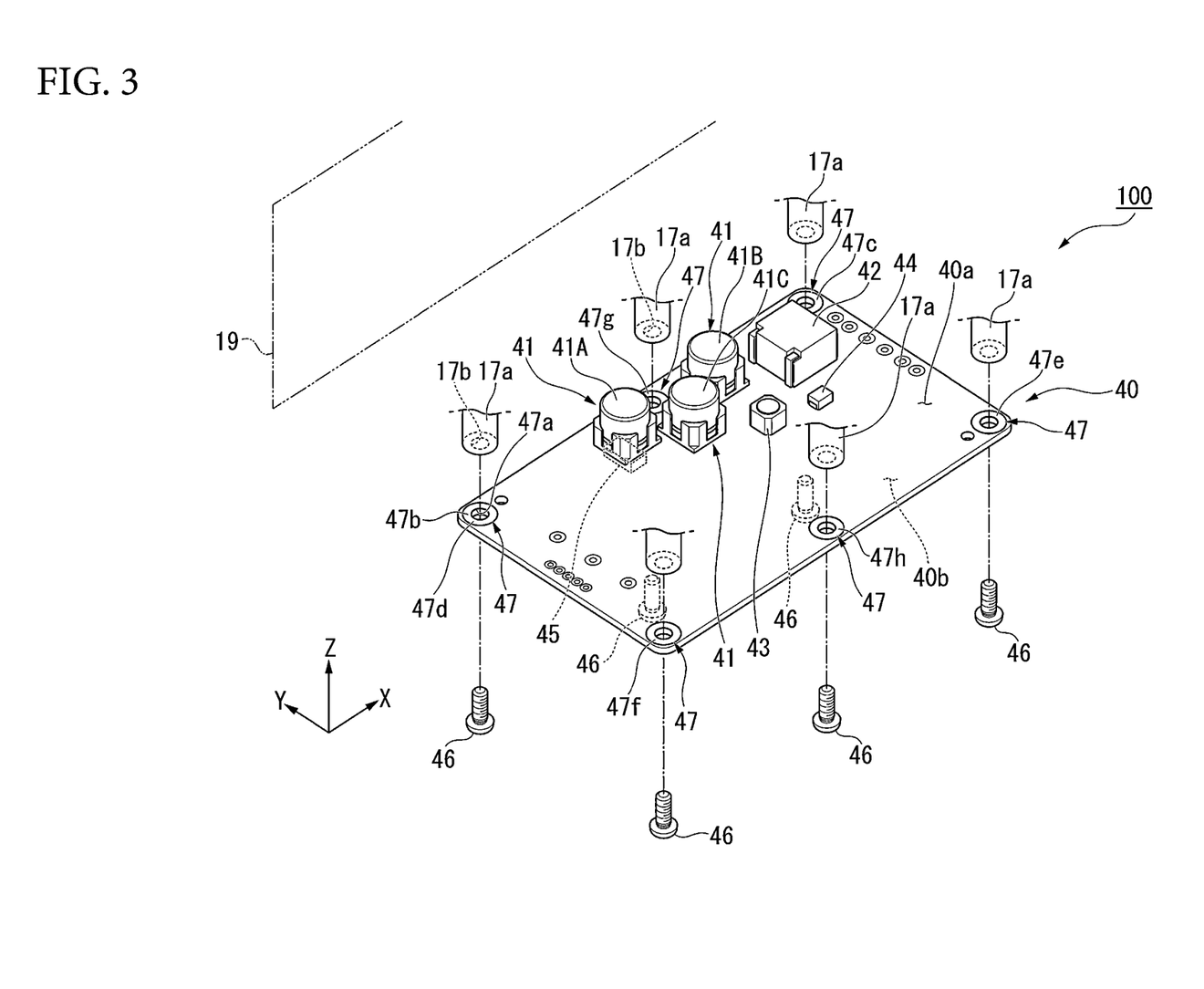
FIG. 3 is a perspective view illustrating a circuit board of an embodiment.

The face, of the mounting portion 18, on the one side in the mounting direction (+Y side) is a mounting face 19 attached to the device M. That is, the housing 10 has the mounting face 19 attached to the device M as a predetermined object. The mounting face 19 is a face, of the housing 10, on the one side in the mounting direction. The mounting face 19 is a face directed radially outward. The mounting face 19 is orthogonal to the mounting direction. In the present embodiment, the mounting face 19 is parallel to both the vertical direction and the axial direction. As shown in FIGS. 3 and 4, in the present embodiment, the mounting face 19 extends in the axial direction. As illustrated in FIG. 4, the mounting face 19 is in contact with the device M. More specifically, the mounting face 19 is in contact with a mounted face Ma of the device M. The mounted face Ma is a face directed in the other side in the mounting direction (−Y side). The mounted face Ma is provided with a screw hole (not illustrated) into which the bolt B is fastened.

As illustrated in FIG. 1, the housing body 11 has a first through hole 11d axially connecting the inside of the first housing recess 11a and the inside of the second housing recess 11b. An oil seal 24 that seals between an inner peripheral face of the first through hole 11d and an outer peripheral face of a shaft 21 described later is held in the first through hole 11d. The housing body 11 has a second through hole 11e axially connecting the inside of the first housing recess 11a and the inside of the third housing recess 11c.

The board cover 14 is a box-shaped member that opens upward. The board cover 14 extends in the axial direction. The board cover 14 includes a board cover main body portion 14a attached to the lower side of the housing body 11 and a connector portion 14b protruding from the board cover main body portion 14a to the front side (+X side).

The motor 20 is housed in the first housing recess 11a. The motor 20 includes a rotor 22 having the shaft 21, a stator 23, a first bearing 27, and a second bearing 28. The rotor 22 is capable of rotating about a center axis J extending in the axial direction. The shaft 21 has a columnar shape centered on the center axis J and extending in the axial direction. The shaft 21 is rotatably supported about the center axis J by the first bearing 27 and the second bearing 28. In the present embodiment, each of the first bearing 27 and the second bearing 28 is a rolling bearing. The first bearing 27 is held by the motor cover 12. The second bearing 28 is held in the first through hole 11d. An end, of the shaft 21, on the front side (+X side) protrudes into the second housing recess 11b via the first through hole 11d and is coupled to the pump mechanism 30. The stator 23 is located radially outside the rotor 22. The stator 23 is fixed to the inner peripheral face of the first housing recess 11a. The stator 23 includes a coil 23c.

The pump mechanism 30 is housed in the second housing recess 11b. The pump mechanism 30 has an inner rotor 31 and an outer rotor 32. The inner rotor 31 is coupled to a portion, of the shaft 21, protruding into the second housing recess 11b. With this configuration, the pump mechanism 30 is coupled to the rotor 22. The outer rotor 32 has an annular shape surrounding the inner rotor 31. The inner rotor 31 and the outer rotor 32 mesh with each other. Rotation of the inner rotor 31 by the shaft 21 also rotates the outer rotor 32.

The bus bar assembly 50 is located at the rear side (−X side) of the stator 23 in the first housing recess 11a. The bus bar assembly 50 includes a first bus bar 51a, a second bus bar 51b, and a bus bar holder 52. The bus bar holder 52 is located at the rear side of the stator 23. The first bus bar 51a is held by the bus bar holder 52. The first bus bar 51a is electrically connected to the coil 23c of the stator 23. The second bus bar 51b is electrically connected to the first bus bar 51a. The second bus bar 51b extends downward from the first bus bar 51a. The second bus bar 51b extends to the circuit board 40 through the second through hole 11e. The second bus bar 51b is electrically connected to the circuit board 40. Accordingly, the stator 23 is electrically connected to the circuit board 40 via the first bus bar 51a and the second bus bar 51b.

The circuit board 40 is located radially outside the motor 20. In the present embodiment, the circuit board 40 is located below the motor 20. The circuit board 40 is located between the board housing 17 and the board cover 14 in the vertical direction. The circuit board 40 has a plate shape whose plate face is directed in the radial direction. The plate face of the circuit board 40 includes an upper plate face 40a facing upward and a lower plate face 40b facing downward. As illustrated in FIG. 3, the upper plate face 40a and the lower plate face 40b are disposed along a direction intersecting the mounting face 19. In the present embodiment, the upper plate face 40a and the lower plate face 40b are disposed along a mounting direction orthogonal to the mounting face 19. More specifically, the upper plate face 40a and the lower plate face 40b extend in the mounting direction and the axial direction. The upper plate face 40a and the lower plate face 40b are orthogonal to the vertical direction. Although not illustrated, wiring patterns are provided on the upper plate face 40a and the lower plate face 40b.

As illustrated in FIGS. 3 and 4, the circuit board 40 has a rectangular plate shape extending in the axial direction. In the present embodiment, the circuit board 40 has a rounded rectangular shape having a long side along the axial direction and a short side along the mounting direction when viewed in the vertical direction. As illustrated in FIG. 4, in the present embodiment, the center position of the circuit board 40 in the mounting direction is the same as the position of the center axis J in the mounting direction. In other words, when viewed in the vertical direction, the center axis J overlaps the center of the circuit board 40 in the mounting direction.

The circuit board 40 has a plurality of fixing portions 47 fixed to the housing 10. Each fixing portion 47 is provided at an outer peripheral edge portion of the circuit board 40. In the present embodiment, six fixing portions 47 are provided. The six fixing portions 47 include fixing portions 47c and 47d provided at two corner portions of the rectangular plate-like circuit board 40 on the one side in the mounting direction (+Y side), fixing portions 47e and 47f provided at two corner portions of the circuit board 40 on the other side in the mounting direction (−Y side), a fixing portion 47g provided at a central portion between the fixing portion 47c and the fixing portion 47d in the axial direction, and a fixing portion 47h provided at a central portion between the fixing portion 47e and the fixing portion 47f in the axial direction. The fixing portion 47c is located at the front side (+X side) relative to the fixing portion 47d. The fixing portion 47e is located at the front side relative to the fixing portion 47f. In the present embodiment, the fixing portion 47g is disposed slightly shifted to the front side relative to the fixing portion 47h. The fixing portion 47g is disposed slightly shifted to the front side relative to the axial center of the circuit board 40. The fixing portion 47h is disposed at the axial center of the circuit board 40.

Each fixing portion 47 has a through hole 47a penetrating the circuit board 40 in the vertical direction, and a peripheral edge portion 47b surrounding the through hole 47a. In the present embodiment, the through hole 47a is a circular hole. As illustrated in FIG. 3, a bolt 46 passes through the through hole 47a from below. The bolt 46 passes through the through hole 47a from below and is tightened into a screw hole 17b provided in the housing 10. Thus, the fixing portion 47 is fixed to the housing 10 by the bolt 46. In the present embodiment, the screw hole 17b is provided at the lower end of a boss portion 17a provided in the board housing 17. The boss portion 17a has a cylindrical shape protruding downward. The screw hole 17b is recessed upward from the lower face of the boss portion 17a. Six boss portions 17a are provided.

The peripheral edge portion 47b has an annular shape. The head of the bolt 46 is in contact with the lower face of the peripheral edge portion 47b. The lower face of the boss portion 17a is in contact with the upper face of the peripheral edge portion 47b. For example, no wiring pattern is provided on the upper face and the lower face of the peripheral edge portion 47b.

The electric pump 100 includes an electrolytic capacitor 41, a choke coil 42, an inductor 43, a diode 44, and a shunt resistor 45. The electrolytic capacitor 41, the choke coil 42, the inductor 43, the diode 44, and the shunt resistor 45 are electronic components attached to the plate face of the circuit board 40. The electrolytic capacitor 41, the choke coil 42, the inductor 43, and the diode 44 are attached to the upper plate face 40a of the plate face of the circuit board 40. The shunt resistor 45 is attached to the lower plate face 40b of the plate face of the circuit board 40. The electrolytic capacitor 41, the choke coil 42, the inductor 43, the diode 44, and the shunt resistor 45 together with the circuit board 40 are housed inside the housing 10.

Electrolytic capacitor 41 has a columnar shape protruding upward from upper plate face 40a. The type of the electrolytic capacitor 41 is not particularly limited. As shown in FIG. 4, the electrolytic capacitor 41 is disposed at a position closer to the mounting face 19 than the center axis J in the mounting direction (Y-axis direction) orthogonal to the mounting face 19. In the present embodiment, electrolytic capacitor 41 is disposed at a position closer to the mounting face 19 than the center of gravity G of electric pump 100 in the mounting direction orthogonal to the mounting face 19. In other words, the electrolytic capacitor 41 is disposed at a position closer to the mounting face 19 than the imaginary line IL passing through the center of gravity G and extending in the axial direction when viewed in the vertical direction. In the present embodiment, the center of gravity G and the imaginary line IL are located toward the one side in the mounting direction (+Y side) relative to the center axis J. That is, in the present embodiment, the center of gravity G and the imaginary line IL are disposed at a position closer to the mounting face 19 than the center axis J in the mounting direction. The axial position of the center of gravity G is, for example, the same as the position of the axially central portion of the circuit board 40 in the axial direction.

In the present specification, "A certain object is disposed at a position closer to the mounting face than another object in the mounting direction orthogonal to the mounting face" means that the center position of the certain object in the mounting direction may be closer to the position of the mounting face in the mounting direction than the center position of the another object in the mounting direction. That is, "the electrolytic capacitor 41 is disposed closer to the mounting face 19 than the center axis J in the mounting direction" means that the center position of the electrolytic capacitor 41 in the mounting direction may be closer to the position of the mounting face 19 in the mounting direction than the position of the center axis J in the mounting direction. In addition, "the electrolytic capacitor 41 is disposed at a position closer to the mounting face 19 than the center of gravity G in the mounting direction" means that the center position of the electrolytic capacitor 41 in the mounting direction may be closer to the position of the mounting face 19 in the mounting direction than the position of center of the gravity G in the mounting direction. In the present embodiment, the entire electrolytic capacitor 41 is located toward the one side in the mounting direction (+Y side) relative to the center axis J, the center of gravity G, and the imaginary line IL.

In the present embodiment, a plurality of electrolytic capacitors 41 is provided. Three electrolytic capacitors 41, namely, an electrolytic capacitor 41A, an electrolytic capacitor 41B, and an electrolytic capacitor 41C are provided. The electrolytic capacitor 41A, the electrolytic capacitor 41B, and the electrolytic capacitor 41C are located at a central portion of the upper plate face 40a of the circuit board 40 in the axial direction in a portion at the one side in the mounting direction (+Y side). The electrolytic capacitor 41A, the electrolytic capacitor 41B, and the electrolytic capacitor 41C are disposed side by side along the axial direction. The electrolytic capacitor 41B is located at the front side (+X side) relative to the electrolytic capacitor 41A. Electrolytic capacitor 41C is located between the electrolytic capacitor 41A and the electrolytic capacitor 41B in the axial direction.

In the present specification, "a plurality of certain objects is disposed side by side along the axial direction" means that the plurality of certain objects may overlap each other at least partially when the plurality of certain objects is viewed in the axial direction. In the present embodiment, the electrolytic capacitor 41C is disposed shifted toward the other side in the mounting direction (−Y side) relative to the electrolytic capacitor 41A and the electrolytic capacitor 41B. A portion of the electrolytic capacitor 41C on the one side in the mounting direction (+Y side) overlaps a portion of the electrolytic capacitor 41A on the other side in the mounting direction and a portion of the electrolytic capacitor 41B on the other side in the mounting direction when viewed in the axial direction. Electrolytic capacitor 41A and electrolytic capacitor 41B are disposed at the same position in the mounting direction. The entire electrolytic capacitor 41A and the entire electrolytic capacitor 41B overlap each other, for example, when viewed in the axial direction.

In the present embodiment, the plurality of electrolytic capacitors 41A, 41B, 41C is disposed around one fixing portion 47g of the plurality of fixing portions 47 when viewed in the vertical direction orthogonal to the plate face of the circuit board 40. The fixing portion 47g is a fixing portion 47 located at the central portion of the circuit board 40 in the axial direction at the edge portion on the one side in the mounting direction (+Y side). When viewed in the vertical direction, the centers of the plurality of electrolytic capacitors 41A, 41B, 41C are disposed at the same distance from the center of the fixing portion 47g. That is, in the present embodiment, the three electrolytic capacitors 41A, 41B, and 41C are disposed along an imaginary arc C centered on the fixing portion 47g when viewed in the vertical direction orthogonal to the plate face of the circuit board 40. When viewed in the vertical direction, the center of the imaginary arc C overlaps the center of the through hole 47a of the fixing portion 47g. When viewed in the vertical direction, the centers of the plurality of electrolytic capacitors 41A, 41B, 41C are located on the imaginary arc C.

The electrolytic capacitor 41A and the electrolytic capacitor 41B are disposed with the fixing portion 47g interposed therebetween in the axial direction when viewed in the vertical direction orthogonal to the plate face of the circuit board 40. More specifically, a portion of the electrolytic capacitor 41A on the one side in the mounting direction (+Y side) and a portion of the electrolytic capacitor 41B on the one side in the mounting direction are disposed with a portion of the fixing portion 47g on the other side in the mounting direction (−Y side) interposed therebetween in the axial direction when viewed in the vertical direction. Electrolytic capacitor 41C is located toward the other side in the mounting direction relative to the fixing portion 47g.

A portion of the electrolytic capacitor 41A on the one side in the mounting direction (+Y side) is located between a portion of the fixing portion 47d on the other side in the mounting direction (−Y side) and a portion of the fixing portion 47g on the other side in the mounting direction in the axial direction and between a portion of the fixing portion 47c on the other side in the mounting direction and a portion of the fixing portion 47d on the other side in the mounting direction in the axial direction when viewed in the vertical direction. That is, in the present embodiment, each of the fixing portions 47d, 47g and the fixing portions 47c, 47d corresponds to a pair of fixing portions 47 disposed with at least part of the electrolytic capacitor 41A interposed therebetween when viewed in the vertical direction orthogonal to the plate face of circuit board 40.

A portion of the electrolytic capacitor 41B on the one side in the mounting direction (+Y side) is located between a portion of the fixing portion 47c on the other side in the mounting direction (−Y side) and a portion of the fixing portion 47g on the other side in the mounting direction in the axial direction and between a portion of the fixing portion 47c on the other side in the mounting direction and a portion of the fixing portion 47d on the other side in the mounting direction in the axial direction when viewed in the vertical direction. That is, in the present embodiment, each of the fixing portions 47c, 47g and the fixing portions 47c, 47d corresponds to a pair of fixing portions 47 disposed with at least part of the electrolytic capacitor 41B interposed therebetween when viewed in the vertical direction orthogonal to the plate face of circuit board 40.

The electrolytic capacitor 41C is located between the fixing portion 47g and the fixing portion 47h in the mounting direction when viewed in the vertical direction. That is, in the present embodiment, the fixing portions 47g and 47h correspond to a pair of fixing portions 47 disposed with at least part of the electrolytic capacitor 41C interposed therebetween when viewed in the vertical direction orthogonal to the plate face of the circuit board 40.

The choke coil 42 is an electronic component having a mass larger than that of the electrolytic capacitor 41. The choke coil 42 is an inductor. In the present embodiment, the mass of the choke coil 42 is the largest among the masses of the electronic components attached to the circuit board 40. The choke coil 42 is disposed at a position closer to the mounting face 19 than the center axis J in the mounting direction orthogonal to the mounting face 19. In the present embodiment, the choke coil 42 is disposed at a position closer to the mounting face 19 than the center of gravity G in the mounting direction. The entire choke coil 42 is located toward the one side in the mounting direction (+Y side) relative to the center axis J and the center of gravity G. In the present embodiment, choke coil 42 is disposed side by side with the plurality of electrolytic capacitors 41A, 41B, 41C along the axial direction. The choke coil 42 is located toward the front side (+X side) relative to the electrolytic capacitor 41B.

The choke coil 42 is disposed shifted to the other side in the mounting direction (−Y side) relative to the electrolytic capacitors 41A and 41B. A portion of the choke coil 42 on the one side in the mounting direction (+Y side) and a portion of the electrolytic capacitor 41C on one side in the mounting direction are disposed with a portion of the electrolytic capacitor 41B on the other side in the mounting direction interposed therebetween in the axial direction when viewed in the vertical direction. In the present embodiment, the electrolytic capacitor 41A, the electrolytic capacitor 41C, the electrolytic capacitor 41B, and the choke coil 42 are disposed in zigzag in this order from the rear side (−X side) toward the front side (+X side) when viewed in the vertical direction.

In the present embodiment, the inductor 43 is an inductor used for boosting a power supply supplied from the outside to the electric pump 100. The inductor 43 is located toward the other side in the mounting direction (−Y side) relative to the electrolytic capacitor 41B. The inductor 43 is disposed at a position closer to the mounting face 19 than the center axis J in the mounting direction orthogonal to the mounting face 19. The inductor 43 is disposed at a position overlapping the imaginary line IL when viewed in the vertical direction.

In the present embodiment, the diode 44 is a bidirectional transient voltage suppressor (TVS) diode used for a protection circuit that protects electronic components and the like on the circuit board 40 from a surge voltage. The diode 44 is located toward the other side in the mounting direction (−Y side) relative to the choke coil 42. The diode 44 is located toward the front side (+X side) relative to the inductor 43. The diode 44 is disposed at a position closer to the mounting face 19 than the center axis J in the mounting direction orthogonal to the mounting face 19. The diode 44 is located between the center axis J and the imaginary line IL when viewed in the vertical direction.

In the present embodiment, the shunt resistor 45 is attached to the lower plate face 40b so as to overlap the electrolytic capacitor 41A when viewed in the vertical direction. The circuit board 40 is interposed between the shunt resistor 45 and the electrolytic capacitor 41A in the vertical direction. The shunt resistor 45 is disposed at a position closer to the mounting face 19 than the center axis J in the mounting direction orthogonal to the mounting face 19. In the present embodiment, the shunt resistor 45 is disposed at a position closer to the mounting face 19 than the center of gravity G in the mounting direction. The entire shunt resistor 45 is located toward the one side in the mounting direction (+Y side) relative to the center axis J and the center of gravity G.

The electric pump 100 may vibrate in a direction orthogonal to the mounting direction with the mounting face 19 as a fulcrum due to vibration transmitted from the device M. In this case, when the plate face of the circuit board 40 is disposed along the direction intersecting the mounting face 19, the vibration generated in the circuit board 40 by the vibration of the device M tends to be larger in a portion, of the circuit board 40, farther from the mounting face 19 in the mounting direction, that is, a portion located at the other side in the mounting direction (−Y side). Therefore, when the circuit board 40 vibrates in the plate thickness direction due to the vibration from the device M, the amplitude of the vibration generated in the circuit board 40 tends to be larger at a portion farther from the mounting face 19 in the mounting direction. On the other hand, the amplitude of the vibration generated in the circuit board 40 tends to be small in a portion closer to the mounting direction with respect to the mounting face 19.

According to the present embodiment, the electrolytic capacitor 41 is disposed at a position closer to the mounting face 19 than center axis J in the direction orthogonal to the mounting face 19. Therefore, the electrolytic capacitor 41 can be disposed at a portion, of the circuit board 40, relatively close to the mounting face 19. That is, the electrolytic capacitor 41 can be disposed at a portion where the amplitude of the vibration generated in circuit board 40 is relatively small. Consequently, it is easy to reduce the vibration applied to the electrolytic capacitor 41. Therefore, it is possible to suppress occurrence of a defect such as damage to the electrolytic capacitor 41. The electrolytic capacitor 41 is an electronic component that is relatively more likely to be damaged by vibration than other electronic components. Therefore, as described above, it is possible to further suppress the occurrence of a defect in the electrolytic capacitor 41, so that the reliability of the electric pump 100 can be improved.

According to the present embodiment, the electrolytic capacitor 41 is disposed at a position closer to the mounting face 19 than the center of gravity G of the electric pump 100 in the direction orthogonal to the mounting face 19. The amplitude of the vibration generated in the circuit board 40 tends to be particularly large at a position farther from the mounting face 19 than the center of gravity G. Therefore, by disposing the electrolytic capacitor 41 at a position closer to the mounting face 19 than the center of gravity G, the electrolytic capacitor 41 can be disposed at a portion where the amplitude of the vibration generated in circuit board 40 is smaller. Consequently, the vibration applied to electrolytic capacitor 41 can be easily reduced. Thus, it is possible to further suppress the occurrence of a defect in the electrolytic capacitor 41.

According to the present embodiment, the mounting face 19 extends in the axial direction. Therefore, the axial dimension of the mounting face 19 is larger than the vertical dimension of the mounting face 19. In this case, the electric pump 100 is less likely to vibrate around an axis extending in the vertical direction orthogonal to both the axial direction and the mounting direction. On the other hand, the electric pump 100 is likely to vibrate around an axis extending in an axial direction orthogonal to both the vertical direction and the mounting direction. Here, in the present embodiment, the plate face of the circuit board 40 is directed in the radial direction. Therefore, the plate face of the circuit board 40 is along the axial direction. The circuit board 40 is disposed along a direction intersecting the mounting face 19. As a result, the plate thickness direction of the circuit board 40 tends to be the vertical direction orthogonal to both the axial direction and the mounting direction or a direction close to the vertical direction. In this case, as described above, when the electric pump 100 is likely to vibrate around an axis extending in an axial direction orthogonal to both the vertical direction and the mounting direction, the circuit board 40 is likely to vibrate in the plate thickness direction, and the amplitude of the vibration generated in the circuit board 40 is likely to be large. As described above, the electric pump 100 of the present embodiment has a structure in which the amplitude of the vibration generated in the circuit board 40 tends to be large.

According to the present embodiment, as described above, even when the vibration is transmitted from the device M to the electric pump 100, the vibration applied to the electrolytic capacitor 41 is easily reduced, and it is possible to suppress the occurrence of a defect in the electrolytic capacitor 41. That is, in the configuration in which the mounting face 19 extends in the axial direction, the effect that it is possible to suppress the occurrence of a defect in the electrolytic capacitor 41 can be more effectively obtained. With the configuration of the circuit board 40 as described above, it is possible to suppress an increase in size of the electric pump 100 in the axial direction and the mounting direction. That is, according to the present embodiment, it is possible to suppress the occurrence of a defect in the electrolytic capacitor 41 attached to the circuit board 40 while disposing the circuit board 40 in which the electric pump 100 can be prevented from increasing in size in the axial direction and the mounting direction.

According to the present embodiment, the electrolytic capacitor 41 includes two or more electrolytic capacitors 41 disposed side by side along the axial direction. Therefore, as compared with a case where two or more electrolytic capacitors 41 are disposed side by side along the mounting direction, two or more electrolytic capacitors 41 can be disposed closer to the mounting face 19. As a result, it is possible to further suppress the occurrence of a defect in two or more electrolytic capacitors 41. In the present embodiment, since the three electrolytic capacitors 41A, 41B, and 41C are disposed side by side along the axial direction, it is possible to further suppress the occurrence of failure in any of the three electrolytic capacitors 41A, 41B, and 41C.

According to the present embodiment, two or more electrolytic capacitors 41 among the plurality of electrolytic capacitors 41 are disposed along the imaginary arc C centered on one fixing portion 47g among the plurality of fixing portions 47 when viewed in the direction orthogonal to the plate face of the circuit board 40. Therefore, two or more electrolytic capacitors 41 can be disposed around the fixing portion 47g. In the present embodiment, all the electrolytic capacitors 41A, 41B, and 41C are disposed along the imaginary arc C when viewed in the vertical direction, and are disposed around the fixing portion 47g. Here, the amplitude of the vibration generated in the circuit board 40 tends to be smaller around the fixing portion 47 in the circuit board 40. Therefore, by disposing two or more electrolytic capacitors 41 around one fixing portion 47, it is easy to further reduce the vibration applied to the two or more electrolytic capacitors 41. As a result, it is possible to further suppress the occurrence of a defect in two or more electrolytic capacitors 41. In the present embodiment, it is possible to further suppress the occurrence of a defect in all the electrolytic capacitors 41A, 41B, and 41C. In addition, by collectively disposing two or more electrolytic capacitors 41 around one fixing portion 47g, the two or more electrolytic capacitors 41 can be collectively disposed on the circuit board 40, and respective electronic components can be efficiently disposed on the circuit board 40.

According to the present embodiment, the plurality of fixing portions 47 includes the pair of fixing portions 47 disposed with at least part of the electrolytic capacitor 41 interposed therebetween when viewed in the direction orthogonal to the plate face of circuit board 40. As described above, the amplitude of the vibration generated in the circuit board 40 tends to be smaller around the fixing portion 47 in the circuit board 40. Therefore, the amplitude of the vibration generated in the circuit board 40 tends to be small also between the fixing portion 47 and the fixing portion 47. Consequently, at least part of the electrolytic capacitor 41 is disposed between the pair of fixing portions 47, so that the vibration applied to electrolytic capacitor 41 can be easily reduced. Accordingly, it is possible to further suppress the occurrence of a defect in the electrolytic capacitor 41.

Further, according to the present embodiment, the electric pump 100 includes the choke coil 42 attached to the plate face of the circuit board 40 as an electronic component having a mass larger than that of the electrolytic capacitor 41. The choke coil 42 is disposed at a position closer to the mounting face 19 than the center axis J in the direction orthogonal to the mounting face 19. As the electronic component having a relatively large mass is disposed farther from the mounting face 19, the amplitude of the vibration generated in the circuit board 40 tends to be larger due to the mass of the electronic component. Therefore, by disposing the choke coil 42, which is an electronic component having a relatively large mass, at a position closer to the mounting face 19 than the center axis J, it is possible to suppress an increase in amplitude of the vibration generated in the circuit board 40 due to the mass of the choke coil 42. Consequently, the amplitude of the vibration generated in circuit board 40 can be easily reduced, and the vibration applied to electrolytic capacitor 41 can be easily reduced. Thus, it is possible to further suppress the occurrence of a defect in the electrolytic capacitor 41.

According to the present embodiment, the electronic component having a mass larger than that of the electrolytic capacitor 41 is the choke coil 42, which is an inductor. The choke coil 42 tends to have the largest mass among the electronic components attached to the circuit board 40. Therefore, by disposing the choke coil 42 at a position closer to the mounting face 19 than the center axis J, it is easy to more suitably reduce the amplitude of the vibration generated in the circuit board 40. Thus, the vibration applied to the electrolytic capacitor 41 can be more suitably reduced. Therefore, it is possible to further suitably suppress the occurrence of a defect in the electrolytic capacitor 41.

According to the present embodiment, the choke coil 42, which is an electronic component having a larger mass than electrolytic capacitor 41, is disposed side by side with electrolytic capacitor 41 along the axial direction. Therefore, compared with the case that the choke coil 42 is disposed side by side with the electrolytic capacitor 41 along the mounting direction, the choke coil 42 can be disposed closer to the mounting face 19. As a result, it is easy to more suitably reduce the amplitude of the vibration generated in the circuit board 40. Therefore, it is possible to further suitably suppress the occurrence of a defect in the electrolytic capacitor 41.

According to the present embodiment, the electric pump 100 further includes the shunt resistor 45 attached to the plate face of the circuit board 40. The shunt resistor 45 is disposed at a position closer to the mounting face 19 than the center axis J in the direction orthogonal to the mounting face 19. Therefore, similarly to the electrolytic capacitor 41 described above, it is easy to reduce the vibration applied to the shunt resistor 45. Therefore, it is possible to suppress the occurrence of a defect such as damage to the shunt resistor 45. Similarly to the electrolytic capacitor 41, the shunt resistor 45 is an electronic component that is relatively more likely to be damaged by vibration than other electronic components. Therefore, it is possible to further suppress the occurrence of a defect in the shunt resistor 45, so that it is possible to further improve the reliability of the electric pump 100.

The present invention is not limited to the above-described embodiment, and other structures and other methods may be employed within the scope of the technical idea of the present invention. The circuit board may be disposed in any manner as long as the circuit board is located radially outside the motor, the plate face is directed in the radial direction, and the plate face is disposed along the direction intersecting the mounting face. The plate face of the circuit board may be inclined with respect to a direction orthogonal to the mounting face. The plate face of the circuit board may not be orthogonal to the vertical direction. The number and position of the fixing portions in the circuit board are not particularly limited. When a plurality of fixing portions is provided, the plurality of fixing portions may not include a pair of fixing portions with at least part of the electrolytic capacitor interposed therebetween when viewed in a direction orthogonal to the plate face of the circuit board.

The electrolytic capacitor may be disposed at any position as long as it is disposed at a position closer to the mounting face than the center axis in the direction orthogonal to the mounting face. The electrolytic capacitor may be disposed at the same position as the center of gravity of the electric pump in the direction orthogonal to the mounting face, or may be disposed at a position farther from the mounting face than the center of gravity of the electric pump. The electrolytic capacitor may not be disposed around the fixing portion provided on the circuit board.

The number of electrolytic capacitors is not particularly limited. Only one electrolytic capacitor may be provided, only two electrolytic capacitors may be provided, or four or more electrolytic capacitors may be provided. When a plurality of electrolytic capacitors is provided, some two or more electrolytic capacitors among the plurality of electrolytic capacitors may be disposed side by side along the axial direction, and the other one or more electrolytic capacitors among the plurality of electrolytic capacitors may not be disposed side by side along the axial direction. Not all of the plurality of electrolytic capacitors may be disposed along the axial direction. The plurality of electrolytic capacitors may include one or a plurality of electrolytic capacitors that are not disposed along an imaginary arc centered on one fixing portion when viewed in a direction orthogonal to the plate face of the circuit board.

The electronic component having a mass larger than that of the electrolytic capacitor may be an electronic component other than the inductor. When the electronic component having a mass larger than that of the electrolytic capacitor is an inductor, the electronic component may be an inductor other than the choke coil. The arrangement of the electronic component having a mass larger than that of the electrolytic capacitor is not particularly limited. The electronic component having a mass larger than that of the electrolytic capacitor may be disposed at the same position as the center axis in the direction orthogonal to the mounting face, or may be disposed at a position farther from the mounting face than the center axis. An electronic component having a mass larger than that of the electrolytic capacitor may not be provided.

The arrangement of the shunt resistor is not particularly limited. The shunt resistor may be disposed at the same position as the center axis in the direction orthogonal to the mounting face, or may be disposed at a position farther from the mounting face than the center axis. The shunt resistor may not be provided.

The application of the electric pump to which the present invention is applied is not particularly limited. The type of the fluid sent by the electric pump is not particularly limited, and may be water or the like. The predetermined object to which the electric pump is attached may be any object. The electric pump may be mounted on a device other than the vehicle. The electric pump may be disposed in any manner with respect to the vertical direction. The center axis of the motor of the electric pump may extend in a direction inclined with respect to the vertical direction without being orthogonal to the vertical direction, or may extend in parallel with the vertical direction. Each configuration and method described in this description can be combined as appropriate within a scope that does not give rise to mutual contraction.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electric pump attached to a predetermined object, the electric pump comprising:
    a motor having a rotor rotatable about a center axis extending in an axial direction;
    a pump mechanism coupled to the rotor;
    a circuit board located radially outside the motor and having a plate face directed in a radial direction;
    an electrolytic capacitor attached to the plate face of the circuit board; and
    a housing that houses the motor, the pump mechanism, the circuit board, and the electrolytic capacitor therein,
    wherein the housing has a mounting face attached to the predetermined object,
    wherein the mounting face is a face directed radially outward,
    wherein the plate face of the circuit board is disposed along a direction intersecting the mounting face, and
    wherein the electrolytic capacitor is disposed at a position closer to the mounting face than the center axis in a direction orthogonal to the mounting face.

2. The electric pump according to claim 1, wherein the electrolytic capacitor is disposed at a position closer to the mounting face than a center of gravity of the electric pump in a direction orthogonal to the mounting face.

3. The electric pump according to claim 1, wherein the mounting face extends in the axial direction.

4. The electric pump according to claim 1,
    wherein the electrolytic capacitor includes a plurality of the electrolytic capacitors, and
    wherein the electrolytic capacitors include two or more electrolytic capacitors disposed side by side along the axial direction.

5. The electric pump according to claim 1,
    wherein the circuit board includes a plurality of fixing portions fixed to the housing,
    wherein the electrolytic capacitor includes a plurality of the electrolytic capacitors, and
    wherein two or more electrolytic capacitors of the plurality of electrolytic capacitors are disposed along an imaginary arc centered on one fixing portion of the plurality of fixing portions when viewed in a direction orthogonal to the plate face of the circuit board.

6. The electric pump according to claim 1,
    wherein the circuit board includes a plurality of fixing portions fixed to the housing, and
    wherein the plurality of fixing portions include a pair of fixing portions disposed with at least part of the electrolytic capacitor interposed therebetween when viewed in a direction orthogonal to the plate face of the circuit board.

7. The electric pump according to claim 1, further comprising:
    an electronic component attached to the plate face of the circuit board and having a mass larger than a mass of the electrolytic capacitor,
    wherein the electronic component is disposed at a position closer to the mounting face than the center axis in a direction orthogonal to the mounting face.

8. The electric pump according to claim 7, wherein the electronic component is an inductor.

9. The electric pump according to claim 7, wherein the electronic component is disposed side by side with the electrolytic capacitor along the axial direction.

10. The electric pump according to claim 1, further comprising:
    a shunt resistor attached to the plate face of the circuit board,
    wherein the shunt resistor is disposed at a position closer to the mounting face than the center axis in a direction orthogonal to the mounting face.

* * * * *